Nov. 6, 1956

F. HUTCHINSON ET AL 2,769,937
TUNABLE STABILIZED MAGNETRON
Filed May 10, 1946

INVENTORS
FRANKLIN HUTCHINSON
MELVIN A. HERLIN
BY *M. A. Hayes*
ATTORNEY

United States Patent Office 2,769,937
Patented Nov. 6, 1956

2,769,937
TUNABLE STABILIZED MAGNETRON

Franklin Hutchinson, New Haven, Conn., and Melvin A. Herlin, Cambridge, Mass., assignors to the United States of America as represented by the Secretary of the Navy Application May 10, 1946, Serial No. 668,702

10 Claims. (Cl. 315—39.77)

This invention relates to electrical apparatus and more particularly to improvements in tunable magnetrons.

In the so-called "cavity tunable magnetron" a fixed frequency plural cavity magnetron is fitted with a tunable external cavity resonator, variation of the resonant frequency of this cavity resulting in a somewhat smaller frequency variation in the output of the magnetron. The cavity performs the dual function of tuning the magnetron and providing frequency stabilization. The addition of such an external cavity to a magnetron results in added difficulty in manufacture. Previous designs of cavity tunable magnetrons have been rather large in physical size and weight due to the excessive number of external channels, that is, the power output line, the cathode leads, and the external cavity resonator. The presence of these extenral components also decreased the durability of the tube. In magnetron applications where the transmitter must be transported it is desirable that a magnetron be available that is light in weight, of small physical size, and easily manufactured.

Accordingly an object of the present invention is to simplify and expedite the manufacture of cavity tunable magnetrons.

A further object is to decrease the energy losses in such a cavity tunable magnetron.

A still further object is to increase the durability and decrease the fragility of such a cavity tunable magnetron.

Figure 2:
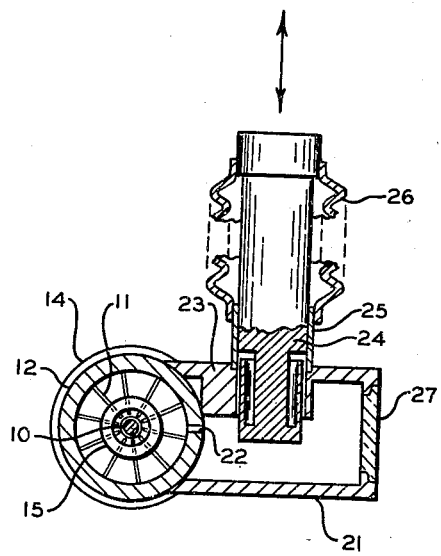
Figure 1:
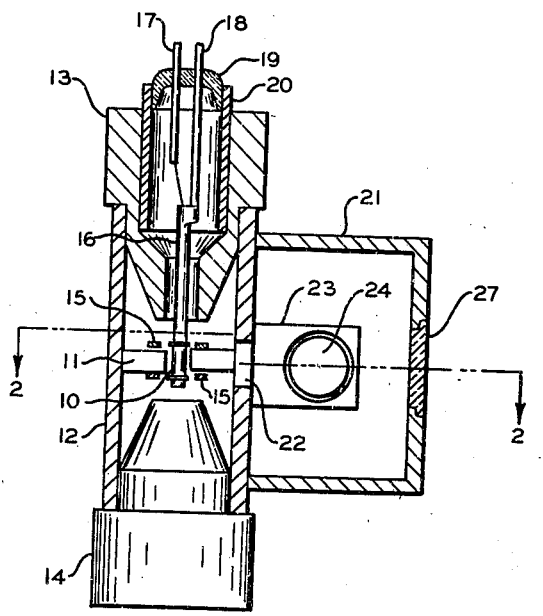

Other objects and advantages of the invention will be apparent during the course of the following description taken with the accompanying drawings in which:

Fig. 1 shows a simplified partially cross-sectioned drawing in a plane parallel to the axis of a cavity tunable magnetron which constitutes one embodiment of the present invention; and Fig. 2 is a simplified partially cross-sectioned plan view of Fig. 1 on the plane 2—2 of Fig. 1.

Essentially the principle of the invention is to combine the output line and the external cavity resonator. In the embodiment shown, the tunable external cavity resonator serves as a combined tuning and frequency stabilizing cavity and as the power output channel for the magnetron.

The geometry of the cavity resonator is such that the output coupling aperture which serves to couple energy from the cavity resonator to the load is not required to transmit all of the energy incident upon it without reflection, since energy reflected from the output coupling aperture is stored in the cavity resonator; this stored up energy in the cavity resonator is necessary for proper frequency stabilization of the magnetron. This simplifies the impedance matching problem for the output coupling aperture. The dimensions of the output coupling aperture are considerably decreased as compared to the dimensions of the output coupling aperture in a separate output channel in which the aperture should transmit all the energy incident on it without reflection.

There is included in the embodiment shown, a mechanical improvement within the magnetrons proper for the purpose of expediting the manufacture. This is in the method of strapping the anode. In previous plural cavity magnetrons, the anode vanes or segments are notched so that alternate segments may be connected to one of two circular straps. In the present construction alternate anode segments are displaced slightly in a direction parallel to the axis of the magnetron and are connected to one of two opposite circular straps. The straps are disposed above and below the anode segments and the axial displacement of alternate anode segments provides clearance between the straps and the anode segments which are not connected thereto.

In Figs. 1 and 2 wherein is shown one embodiment of the present invention, numeral 10 designates a substantially cylindrical cathode surrounded by a plurality of radial anode vanes or anode segments 11 which terminate in an annular anode ring 12. A magnetic field is maintained parallel to the magnetron axis, that is, the axis of the cathode 10, in the customary fashion. The magnetic circuit includes two magnetic pole pieces 13 and 14, the upper pole piece 13 having a hollow core for the passage of the leads to cathode 10.

Alternate anode segments 11 are connected to one of two circular conducting straps 15. The principle of strapping is prior art, but the method employed herein is novel and advantageous. Alternate anode segments 11 are displaced slightly with respect to one another in a direction parallel to the magnetron axis, and are connected to opposite circular straps 15. This axial displacement provides clearance between the straps and the anode segments not connected thereto.

Referring to Fig. 1, numeral 16 designates a coaxial cathode line passing through the hollow core of pole piece 13. The external connections to the inner and outer conductors of the coaxial line 16 are cathode connections 17 and 18 respectively. In the customary manner, connections 17 and 18 are connected to a cathode heating element within the cathode 10 and not shown, connection 18 being the common cathode and heater lead. The vacuum within the magnetron is maintained by a glass seal 19 affixed to a metallic tube 20. Tube 20 preferably has a temperature coefficient of expansion equal to that of glass seal 19. The tube 20 also serves to shield cathode connections 17 and 18 before their juncture with coaxial cathode line 16.

Referring to Figures 1 and 2, numeral 21 designates an external tunable cavity resonator which is electrically coupled to the magnetron by an H-shaped coupling aperture 22.

Inasmuch as there are various methods of coupling an external resonator to a magnetron, the invention is not limited to this method of coupling. Other types of coupling apertures, coupling loops or coupling probes may be used, if desired.

The cavity resonator 21 is fitted with an impedance matching step on section 23 adjacent to aperture 22. The impedance matching step serves in the customary fashion to effect a better impedance match between the impedance of the cavity resonator 21 and the impedance of the magnetron as seen at the input coupling aperture 22.

Tuning of the cavity resonator 21 is effected by a standard choke type tuning plunger 24, operating within a bushing 25. A sylphon-bellows 26, attached at one end to the end fo plunger 24 and at the other end to bushing 25, maintains a hermetic seal of the cavity resonator 21.

Inasmuch as various methods of tuning cavity resonator 21 are well known to the art, the invention is not limited to the herein described method of tuning.

The power output of the magnetron may be taken at an output coupling aperture 27 in the wall of cavity resonator 21 opposite the input coupling aperture 22. This out-

What is claimed is:

1. A strapped anode for a plural cavity magnetron, including an annular anode ring, a plurality of anode segments connected to said anode ring and extending radially inward towards the axis of said anode ring, two substantially circular straps disposed about the axis of said anode ring and on opposite sides of said anode segments, alternate anode segments being displaced slightly in a direction parallel to the axis of said anode ring and being connected to opposite circular straps thereby providing clearance between said straps and the segments not connected thereto.

2. A strapped anode for a plural cavity magnetron, said strapped anode comprising, an anode ring, a plurality of anode segments connected to said anode ring and extending inwardly towards a central axis, two conductive straps disposed about said axis and on opposite sides of said anode segments, alternate anode segments being displaced slightly in a direction parallel to said axis and connected to one of said conductive straps, the remaining anode segments being connected to the other of said conductive straps.

3. A strapped anode for a plural cavity magnetron, said strapped anode comprising an anode ring, a plurality of substantially identical anode segments connected to said anode ring and extending inwardly towards a central axis, two conductive straps disposed about said axis and on opposite sides of said anode segments, alternate anode segments being displaced slightly in a direction parallel to said axis and connected to one of said conductive straps, the remaining anode segments being connected to the other of said conductive straps.

4. A strapped anode for a plural cavity magnetron, said strapped anode comprising, an annular anode ring, a plurality of substantially identical anode segments connected to said anode ring and extending radially inward towards the axis of said anode ring, to substantially circular conductive straps disposed about the axis of said anode ring and on opposite sides of said anode segments, alternate anode segments being displaced slightly in a direction parallel to said axis and connected to one of said conductive straps, the remaining anode segments being connected to the other of said conductive straps.

5. A magnetron structure comprising a plural cavity magnetron including, an anode ring, a plurality of anode segments connected to said anode ring and extending inwardly towards a central axis, said anode segments and said anode ring defining the cavities of said plural cavity magnetron, and two conductive straps disposed about said axis and on opposite sides of said anode segments, alternate anode segments being displaced slightly in a direction parallel to said axis and connected to one of said conductive straps, the remaining anode segments being connected to the other of said conductive straps, and a cavity resonator, said anode ring of said plural cavity magnetron being formed with an aperture therein, said aperture coupling one cavity of said plural cavity magnetron to said cavity resonator, tuning means coupled to said cavity resonator for varying the resonant frequency thereof and a partially reflecting output coupling means coupled to said cavity resonator, said cavity resonator thereby serving as a combined frequency stabilizing means and an output coupling means for said magnetron structure.

6. A magnetron structure comprising a plural cavity magnetron including an annular anode ring, a cavity resonator, said annular anode ring forming at least a portion of one wall of said cavity resonator, said annular anode ring being formed with an aperture therein coupling one cavity of said plural cavity magnetron to said cavity resonator, tuning means coupled to said cavity resonator for varying the resonant frequency thereof, and a partially reflecting output coupling means coupled to said cavity resonator, said cavity resonator thereby serving as a combined frequency stabilizing means and an output coupling means for said magnetron structure.

7. A magnetron structure comprising a plural cavity magnetron including an annular anode ring, a cavity resonator, said annular anode ring forming at least a portion of one wall of said cavity resonator, said annular anode ring being formed with an aperture therein coupling one cavity of said plural cavity magnetron to said cavity resonator, impedance matching means disposed in said cavity resonator adjacent said aperture for matching said aperture to said cavity resonator, tuning means coupled to said cavity resonator for varying the resonant frequency thereof, and a partially reflecting output coupling means coupled to said cavity resonator, said cavity resonator thereby serving as a combined frequency stabilizing means and an output coupling means for said magnetron structure.

8. A combined tuning, frequency stabilizing and output coupling device adapted for external attachment to a plural cavity magnetron, said device including a cavity resonator having an input coupling aperture adapted to electrically couple said resonator to the magnetron, power output coupling means adapted to couple radio frequency energy out of said resonator, said power output coupling means being a substantially circular aperture in the wall of said cavity resonator opposite the input coupling aperture, and tuning means coupled to said resonator for varying the resonant frequency of said resonator.

9. A combined tuning, frequency stabilizing, and output coupling device adapted for external attachment to a plural cavity magnetron, said device including a cavity resonator having an input coupling aperture adapted to electrically couple said resonator to the magnetron, power output coupling means adapted to couple radio frequency energy out of said resonator, the internal dimensions of said resonator adjacent to the input coupling aperture being proportioned to form an impedance matching section whereby the impedance of the resonator may be matched to the impedance of the magnetron at the input coupling aperture, and tuning means coupled to said resonator for varying the resonant frequency of said resonator.

10. A combined tuning, frequency stabilizing, and output coupling device adapted for external attachment to a plural cavity magnetron, said device including a cavity resonator having an input coupling aperture adapted to electrically couple said resonator to the magnetron, power output coupling means adapted to couple radio frequency energy out of said resonator, and tuning means coupled to said resonator, said tuning means including a choke-type plunger disposed through the wall of said resonator, a sylphon-bellows connected to said plunger and adapted to hermetically seal the resonator adjacent to said plunger, and means for moving said plunger thereby varying the resonant frequency of said resonator.

References Cited in the file of this patent

UNITED STATES PATENTS

| | | |
|---|---|---|
| 2,413,385 | Schmidt | Dec. 31, 1946 |
| 2,414,085 | Hartman | Jan. 14, 1947 |
| 2,421,636 | McArthur et al. | June 3, 1947 |
| 2,421,912 | Spooner | June 10, 1947 |
| 2,445,282 | Slater | July 13, 1948 |
| 2,501,545 | Sproull | Mar. 21, 1950 |
| 2,523,286 | Fiske et al. | Sept. 26, 1950 |
| 2,659,028 | Kyhl | Nov. 10, 1953 |